(12) United States Patent
Amiri et al.

(10) Patent No.: US 7,251,336 B2
(45) Date of Patent: Jul. 31, 2007

(54) ACOUSTIC TALKER LOCALIZATION

(75) Inventors: Maziar Amiri, Richmond Hill (CA); Dieter Schulz, Kanata (CA); Michael Tetelbaum, Ottawa (CA)

(73) Assignee: Mitel Corporation, Kanata, Ontario (CA)

( * ) Notice: Subject to any disclaimer, the term of this patent is extended or adjusted under 35 U.S.C. 154(b) by 624 days.

(21) Appl. No.: 09/894,539

(22) Filed: Jun. 28, 2001

(65) Prior Publication Data

US 2002/0001389 A1    Jan. 3, 2002

(30) Foreign Application Priority Data

Jun. 30, 2000   (GB) ................. 0016142.2

(51) Int. Cl.
*H04R 3/00*   (2006.01)
(52) U.S. Cl. .......................... 381/92; 381/56
(58) Field of Classification Search ................ 381/56, 381/92
See application file for complete search history.

(56) References Cited

U.S. PATENT DOCUMENTS

| 4,400,903 | A |  | 8/1983 | Guilli |  |
|---|---|---|---|---|---|
| 4,581,758 | A | * | 4/1986 | Coker et al. | 381/56 |
| 4,653,102 | A |  | 3/1987 | Hansen |  |
| 5,465,302 | A |  | 11/1995 | Lazarri |  |
| 5,737,431 | A |  | 4/1998 | Brandstein |  |
| 6,449,593 | B1 | * | 9/2002 | Valve | 704/233 |

FOREIGN PATENT DOCUMENTS

| GB | 0016142.2 | 1/2001 |
|---|---|---|
| JP | 11018194 | 1/1999 |
| WO | WO 85/02022 A1 | 5/1985 |
| WO | PCT/US00/29862 | 10/2000 |
| WO | WO 01/35118 A1 | 5/2001 |

* cited by examiner

*Primary Examiner*—Vivian Chin
*Assistant Examiner*—Corey Chau
(74) *Attorney, Agent, or Firm*—Marger Johnson McCollom, P.C.

(57) ABSTRACT

An apparatus for locating a talker, comprising a microphone array for receiving multiple audio signals, wherein the microphone array is characterized by a predetermined beampattern, a spectral conditioner for filtering the audio signals to optimize the beampattern for talker localization, a localization estimator for calculating a localization estimate based on the filtered audio signals, an activity detector for detecting periods of speech activity, and decision logic for verifying the localization estimate during the periods of speech activity.

6 Claims, 5 Drawing Sheets

ACOUSTIC TALKER LOCALIZATION

FIELD OF THE INVENTION

The present invention relates generally to audio systems and in particular to a method and apparatus for locating a talker in a noisy or reverberant environment.

BACKGROUND OF THE INVENTION

Localization of sources is required in many applications, such as teleconferencing, where the source position is used to steer a high quality microphone beam toward the talker. In video conferencing systems, the source position may additionally be used to focus a camera on the talker.

It is known in the art to use electronically steerable arrays of sensors in combination with location estimator algorithms to pinpoint the location of a talker in a room. In this regard, high quality and complex beamformers have been used to measure the power at different positions. Estimator algorithms locate the dominant audio source using power information received from the beamformers. Attempts have been made at improving the performance of prior art beamformers by enhancing acoustical audibility using filtering, etc. The foregoing prior art methodologies are described in *Speaker localization using a steered Filter and sum Beamformer,* N. Strobel, T. Meier, R. Rabenstein, presented at the Erlangen work shop 99, vision, modeling and visualization, Nov. 17-19th, 1999, Erlangen, Germany.

Localization of acoustic sources is fraught with practical difficulties. Firstly, reflecting walls (or other objects) generate virtual acoustic images of the source, which can be misidentified as real sources by the location estimator algorithm. Secondly, most of the known locator estimator algorithms are unable to distinguish between noise sources and talkers, especially in the presence of correlated noise and during speech pauses. Voice activity detectors have been used to freeze the localization during speech pauses, thereby minimizing the occurrence of incorrect talker localization as a result of echoes or noise.

SUMMARY OF THE INVENTION

According to the present invention, spectral conditioning is used to enhance the performance of the estimator algorithm by restricting operation of the estimator to a narrow frequency band chosen to optimize localization rather than acoustic audibility, in contrast with the prior art. An activity detector is also used, as known from the prior art, to identify voiced segments. However, according to an important aspect of the invention, a decision logic state machine is implemented for receiving information from the activity detector and spectrally conditioned estimator and in response verifying localization estimates during periods of voice activation.

The method and apparatus of the present invention result in much faster talker localization than prior art approaches (typically less than 40 milliseconds), and require much less computational power. The use of spectral conditioning results in increased resolution (i.e. how close two talkers are allowed to be while ensuring accurate localization). Furthermore, the method and apparatus of the present invention are characterized by high operational stability in the presence of noise.

BRIEF DESCRIPTION OF THE DRAWINGS

A preferred embodiment of the present invention will now be described more fully with reference to the accompanying drawings in which.

DETAILED DESCRIPTION OF THE PREFERRED EMBODIMENT

Figure 1:
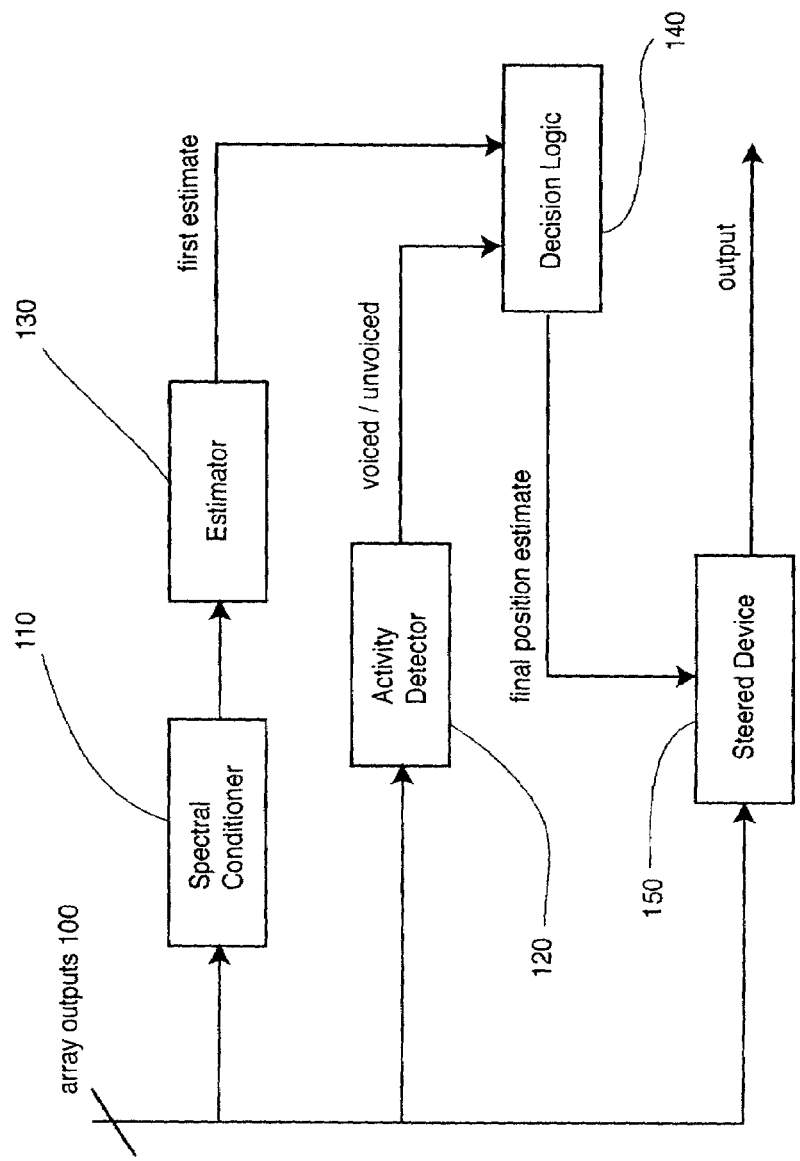
FIG. 1 is a block diagram of a talker localization system according to the present invention.

With reference to FIG. 1, a talker localization system is provided in accordance with the present invention, including an array 100 of microphones, a spectral conditioner 110, an activity detector 120, an estimator 130, decision logic 140 and a steered device 150. It is believed that while some components of the illustrated embodiment are known in the art (e.g. the estimator 130 and activity detector 120), the overall combination of elements is new, as are the addition of spectral conditioner 110 to the estimator 130, and the specific design of the decision logic 140, as described in greater detail below.

The array 100 includes a number of well-known circular microphone arrays, with the microphones covering hundreds of segments of a 360° array. It is common to use five or six microphones per array, although the number of microphones may vary. The signals from microphone array 100 are fed to activity detector 120, spectral conditioner 110 and steered device 150.

Activity detector 120 is a module that determines voiced time segments, as discussed in greater detail below. This information is needed in order to freeze the localization during speech pauses. Any kind of voice activity detection or silence detection algorithm may be used (e.g. an adaptive silence detection algorithm).

Spectral conditioner 110 filters the input to the estimator 130. Each array channel is filtered separately. The purpose of the filtering is to restrict the estimation procedure to a narrow frequency band, chosen for best performance of the estimator 130 as well as to suppress noise sources. Consequently, the beamformer output is optimized for localization of talkers.

Estimator 130 generates a first order position estimation, by segment number, as is known from the prior art. However, as discussed above, the output of estimator 130 can become corrupted by reflecting objects, and noise sources. Activity detector 120 and decision logic 140 operate to reduce the impact of such sources, as discussed in greater detail below.

Decision logic 140 filters the position estimates provided by the estimator 130. The position estimates calculated during speech pauses, are disregarded. The remainder of the position estimates are subjected to a verification process. The output of the decision logic 140 is a verified final position estimate, which is then used by the steered device 150.

Steered Device 150 can be a beamformer, an image tracking algorithm, or other system.

Before discussing the operation of spectral conditioner 110, it is important to recognize that every array 100 is characterized by a predetermined resolution, which depends on the array size, array geometry, the number of sensors (microphones) used, the sampling frequency, and the frequency band of the source. Except for the frequency band of the source, all of these variables are constants for the purpose of the position estimation algorithm of estimator 130. Having regard to the resolution, the algorithm can be restricted to look for the source in a finite number of positions/areas (i.e. segments of a circle).

During operation of the estimator 130, a beamformer instance is "pointed" at each of the positions (i.e. different attenuation weightings are applied to the various microphone output signals). The position having the highest beamformer output is declared to be the source. It should be noted that, in this application, the beamformer instances are used only for energy calculations. The quality of the beamformer output signal is not particularly important. Therefore, the simplest beamforming algorithm (delay & sum beamformer) can be used. In most of the teleconferencing implementations, high quality beamformers (e.g. filter & sum beamformer) are used for measuring the power at each position. Using a simpler beamformer results in fewer computations, fewer instructions, and cheaper DSP chips.

As indicated above, the resolution also depends on the frequency band of the source. The frequency band of speech is between 0 and 20 kHz. The frequency response of a beamformer tends to vary over this frequency range.

Figure 2C:
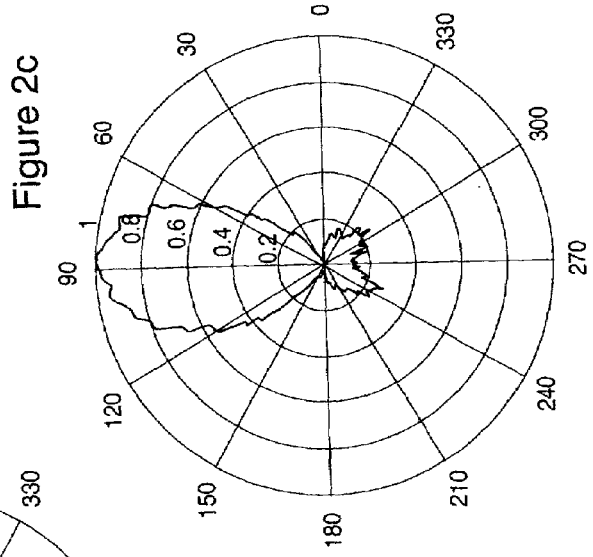
FIGS. 2a, 2b and 2c are beampatterns for a five element circular array which is unfiltered (FIG. 2a), filtered to a low frequency band (FIG. 2b), and filtered to a high frequency band (FIG. 2c)
Figure 2A:
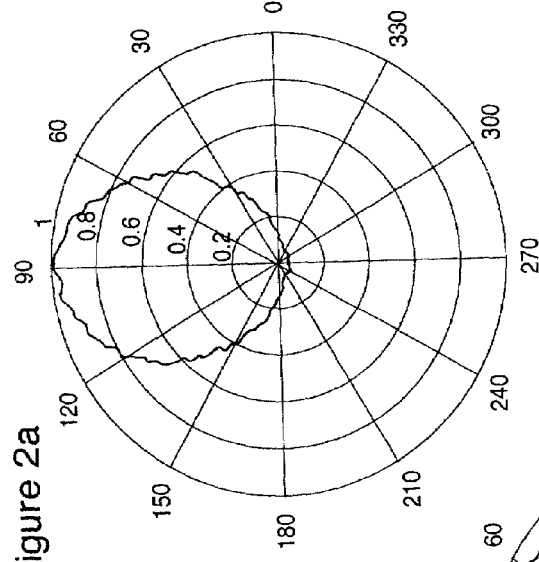
Figure 2B:
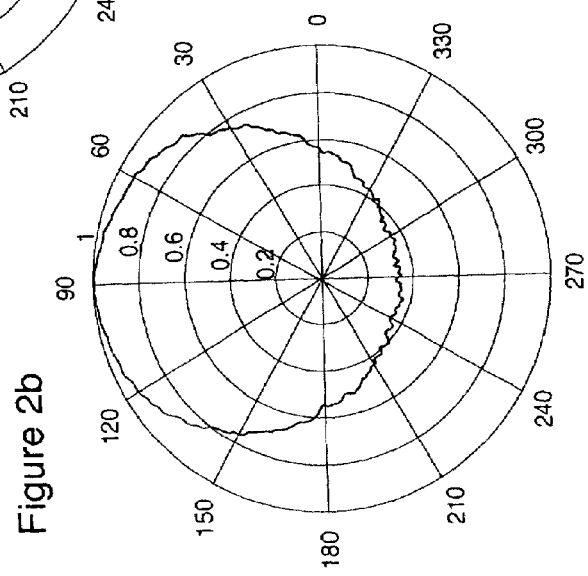

FIG. 2a shows the beampattern of a 5-element circular array 100. The shape of the beam results from the array configuration and the distance between the microphones. For frequencies with a wavelength greater than double the intermicrophone distance (i.e. $\lambda > 2$ ($mic_x - mic_y$)), the array does not obtain a minimum phase difference of $\pi$, which is needed for signal cancellation, thereby broadening the beam. In FIG. 2b, the beampattern is shown for a low frequency band signal (200-500 Hz). In contrast with FIG. 2a, the beampattern is much wider, with poor attenuation in the back. For frequencies resulting in wavelengths $\lambda < 2$ ($mic_x - mic_y$), the array obtains phase differences of several $\pi$, resulting in positive interference in the beamforming calculations, and side lobes in the beampattern. In FIG. 2c, the beampattern is shown for a high frequency band signal (1200-1500 Hz). In this case, the beampattern is narrow, but with significant side lobes.

In order to improve the performance of the estimator 130, bandpass filtering is provided by spectral conditioner 110 for narrowing the beampattern over certain frequency bands (a narrower beam means a better resolution), and suppressing all noise sources which do not radiate in the chosen frequency band. This restricts the influence of noise sources (e.g. electric motors which radiate mainly between 50 and 600 Hz.)

The frequency band where the estimator 130 provides the best results has to be computed empirically. The choice of best frequency band is a tradeoff between:

1. The frequency band where the array provides best beampattern.
2. The frequency band where speech provides most of the audio energy.
3. The frequency band with the least noise source energy.

In a preferred embodiment of the present invention, the bandpass filtering provided by spectral conditioner 110 was centered at 1150 Hz with a bandwidth of 300 Hz. Those of skill in the art will however appreciate that other frequency bands can be used.

Figure 3:
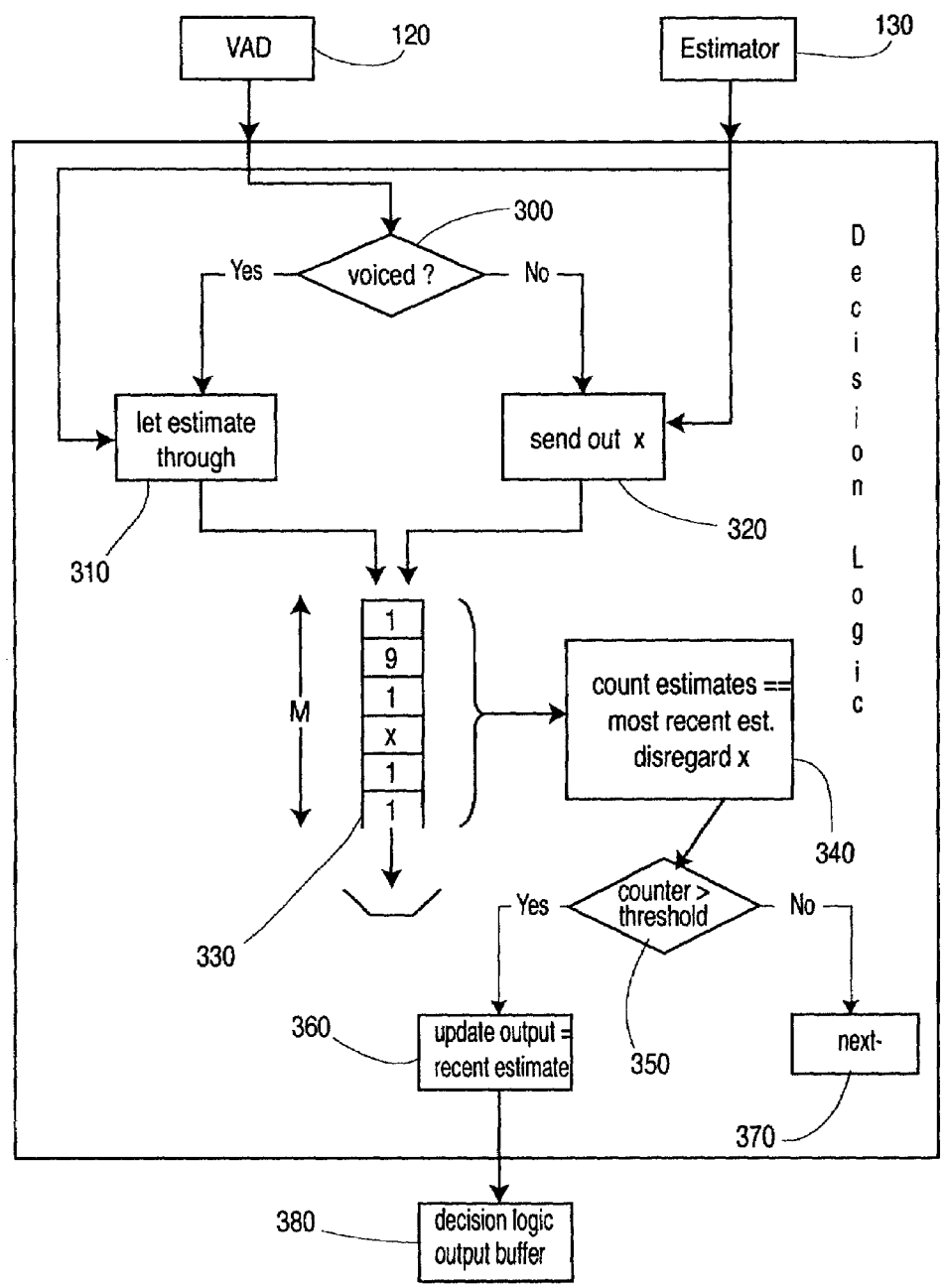
FIG. 3 is a block diagram of a decision logic state machine according to the preferred embodiment of the present invention.

As shown in FIG. 3, decision logic 140 is a state machine which combines the results of activity detector 120 and estimator 130. The decision logic 140 performs two major tasks. Firstly, the decision logic 140 disregards the estimates of source-position provided by estimator 130 during speech pauses (steps 300 and 320). Secondly, the decision logic 140 performs a verification operation on position estimates provided by estimator 130. Specifically, decision logic 140 waits for the localization algorithm to repeat its estimation a predetermined number of times, n, including up to m<n mistakes.

A FIFO stack memory 330 stores past estimates. The size of the stack memory and the minimum number n of correct estimates needed for verification are chosen based on the performance of the activity detector 120 and estimator 130. Every new estimate which has been declared as voiced by activity detector 120 is pushed into the top of FIFO stack memory 330. A counter 340 counts how many times the latest position estimate has occurred in the past, within the size restriction M of the FIFO stack memory 330. If the current estimate has occurred more than n times (a constant threshold), the current position estimate is verified (step 350) and the estimation output is updated (step 360) and stored in a buffer (step 380). If the occurrence counter output is less than n (the threshold), the output remains as it was before (step 370).

During speech pauses no verification is performed (step 300), and a value of 0xFFFFFF(xx) is pushed into the FIFO stack primary 330 instead of the estimate. The output is not changed.

Figure 4:
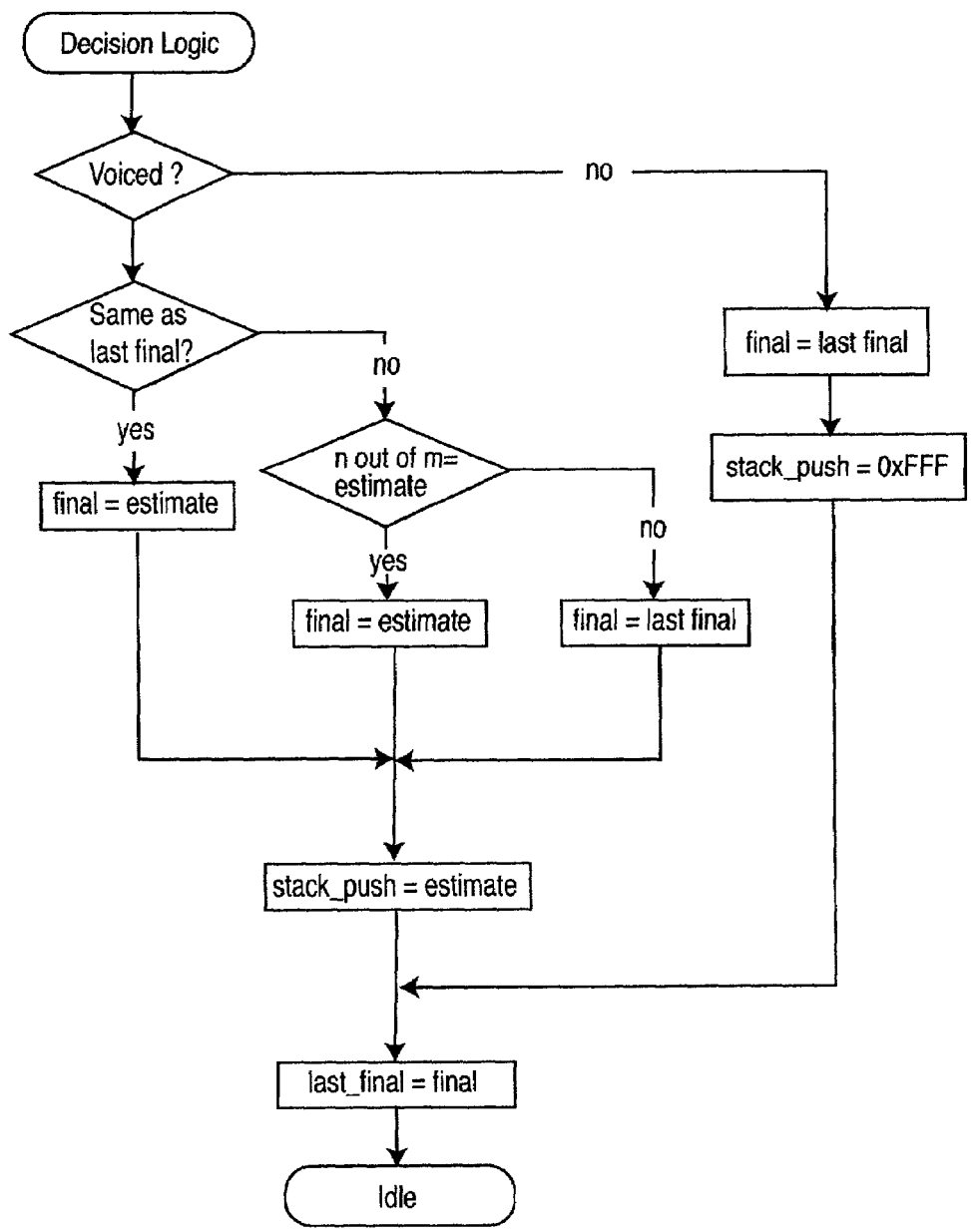
FIG. 4 is a flowchart showing operation of the state machine in FIG. 3.

The operation of decision logic 140 is set forth in flowchart format with reference to FIG. 4.

Figure 5:
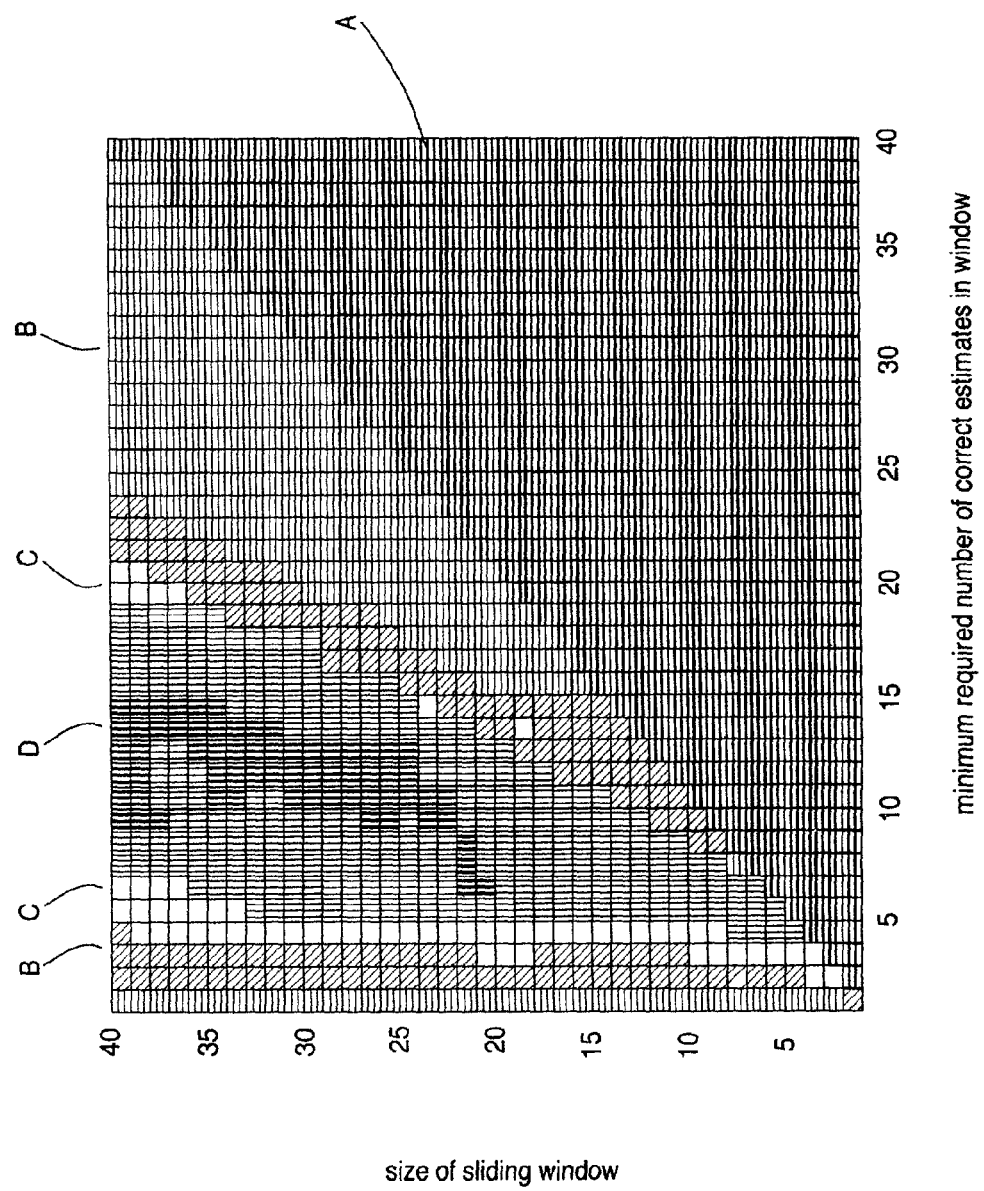
FIG. 5 shows the results of a comparison of actual and estimated talker localization using the system of the present invention.

In order to determine the optimum values of n and M, the output of the system for different combination of these parameters, was compared with ideal behavior. The results of this comparison are shown in FIG. 5. Shaded area A represents the poorest performance, while areas B, C and D represent progressively better performance.

Since the number of correct estimates, n, must be smaller than the size of FIFO stack memory 330, M, the plot has a diagonal shape.

It has been determined that, for a given array 100, activity detector 120 algorithm, spectral condition 110 and estimator 130, a stack size of 32 estimates and a threshold of at least 12 correct estimates in the FIFO stack memory 330 provide optimum performance. The stack memory size and threshold of correct estimates can, however, be reduced slightly without significant loss of accuracy. Of course, the stack memory size and threshold can be further reduced with a decrease in accuracy.

Alternatives and variations of the invention are possible. Furthermore, the principles of the invention may be applied to any beamforming application, where a beam needs to be steered, including teleconferencing, hearing aid devices, microphone arrays for speech pick up in cars or other noisy environments, video conferencing, etc. Localization algorithms in the field of image processing can benefit from using this acoustic localization algorithm of this invention. In video conferencing, the position estimate provided by the present invention may be used to focus a camera on the talker. Although the talker localization system is described as including the spectral conditioner and the decision logic, those of skill in the art will appreciate that the spectral conditioner 110 and decision logic 140 may be used with other components. For example, the spectral conditioner 110 may be used in conjunction with a Kalman filter instead of the decision logic. All such embodiments, modifications and applications are believed to be within the sphere and scope of the invention as defined by the claims appended hereto.

We claim:

1. A method of locating a talker, comprising the steps of:
   receiving multiple audio signals from a microphone away characterized by a predetermined beampattern;
   detecting periods of speech activity in said audio signals and filtering in parallel said audio signals to optimize said predetermined beampattern for talker localization;
   calculating a localization estimate based on the filtered audio signals;
   discarding each localization estimate if calculated during a period where there is no speech activity; and
   verifying said localization estimate during said periods of speech activity;
   wherein said step of verifying includes storing a succession of localization estimates, counting occurrences of said localization estimates during said periods of speech activity and within a predetermined sample window and selecting any one of said occurrences which is repeated more than a predetermined threshold number of times within said window.

2. The method of claim 1, wherein said step of filtering comprises subjecting said audio signals to bandpass filtering at a center frequency of 1150 Hz and a bandwidth of 300 Hz.

3. The method of claim 1, wherein said predetermined threshold number is 12 and said predetermined sample window is 32 estimates.

4. An apparatus for locating a talker, comprising;
   a microphone away for receiving multiple audio signals, said a microphone array being characterized by a predetermined beampattern;
   an activity detector for detecting periods of speech activity in said audio signal;
   a spectral conditioner for filtering said audio signals in parallel to said activity detector, to optimize said predetermined beampattern for talker localization; and
   decision logic for discarding each localization estimate if calculated during periods where there is no speech activity and for verifying said localization estimate during said periods of speech activity;
   wherein said decision logic includes a memory stack for storing up to a predetermined number of localization estimates, a counter for counting occurrences of said localization estimates during said periods of speech activity and selecting any one of said occurrences which is repeated more than a predetermined threshold number of times within said memory stack.

5. The apparatus of claim 4, wherein said spectral conditioner comprises a bandpass filter for filtering said audio signals at a center frequency of 1150 Hz and a bandwidth of 300 Hz.

6. The apparatus of claim 4, wherein said predetermined threshold number is 12 and said predetermined number of localization estimates within said stack is 32.

* * * * *